United States Patent
Rotta

(10) Patent No.: US 10,413,113 B2
(45) Date of Patent: Sep. 17, 2019

(54) MACHINE FOR THE PREPARATION OF LIQUID PRODUCTS VIA CAPSULES

(71) Applicant: Luigi Lavazza S.p.A., Turin (IT)

(72) Inventor: Denis Rotta, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 128 days.

(21) Appl. No.: 15/524,088

(22) PCT Filed: Oct. 23, 2015

(86) PCT No.: PCT/IB2015/058184
§ 371 (c)(1),
(2) Date: May 3, 2017

(87) PCT Pub. No.: WO2016/071794
PCT Pub. Date: May 12, 2016

(65) Prior Publication Data
US 2017/0311747 A1    Nov. 2, 2017

(30) Foreign Application Priority Data
Nov. 6, 2014   (IT) .............................. TO2014A0919

(51) Int. Cl.
*A47J 31/36*         (2006.01)
(52) U.S. Cl.
CPC .................................. *A47J 31/3628* (2013.01)
(58) Field of Classification Search
CPC .. A47J 31/3633; A47J 31/407; A47J 31/3676; A47J 31/368; A47J 31/3695; A47J 31/3623; A47J 31/3628; A47J 31/3638
See application file for complete search history.

(56) References Cited

U.S. PATENT DOCUMENTS 6,584,888 B2 *  7/2003  Cortese ............... A47J 31/3633
                                                     99/289 R
8,770,095 B2 *  7/2014  Pecci .................. A47J 31/3633
                                                     99/295
(Continued)

FOREIGN PATENT DOCUMENTS

DE   10 2010 044 945    12/2011
WO   WO 2008/096385     8/2008

OTHER PUBLICATIONS

International Search Report for PCT/IB2015/058184, dated Jan. 27, 2016, 5 pages.
(Continued)

*Primary Examiner* — Eric Keasel
(74) *Attorney, Agent, or Firm* — Nixon & Vanderhye PC

(57) ABSTRACT

A machine for the preparation of liquid products via capsules comprising a delivery assembly with a preparation chamber, which comprises a first part and a second part. The second part of chamber comprises an injector device, which is configured for introducing a preparation fluid into a capsule and has a hollow body and includes a first body part and a second body part. Defined between the two body parts is a chamber, housed in which is a perforation device having at least one front perforation element that is axially aligned to a respective through hole, defined in a front wall of the second body part of the injector device. The second body part is slidable, against the action of elastic means, from an advanced position, in which the at least one perforation element does not project substantially beyond the front wall, to a retracted position, where the at least one perforation element projects substantially beyond the front wall. The elastic means comprise a bending spring that extends in a direction transverse to the direction of axial sliding (X) of the second body part with respect to the first body part.

14 Claims, 7 Drawing Sheets

(56) References Cited

U.S. PATENT DOCUMENTS 9,215,947 B2 * 12/2015 Sonderegger ....... A47J 31/3623
9,351,602 B2 *  5/2016 Icardi ................. A47J 31/3633

OTHER PUBLICATIONS

Written Opinion of the ISA for PCT/IB2015/058184, dated Jan. 27, 2016, 5 pages.

* cited by examiner

MACHINE FOR THE PREPARATION OF LIQUID PRODUCTS VIA CAPSULES

This application is the U.S. national phase of International Application No. PCT/IB2015/058184 filed Oct. 23, 2015 which designated the U.S. and claims priority to IT Patent Application No. TO2014A000919 filed Nov. 6, 2014, the entire contents of each of which are hereby incorporated by reference.

TECHNICAL FIELD

The present disclosure relates to machines for the preparation of beverages and liquid products in general by means of capsules. The invention has been developed with particular reference to delivery assemblies for machines of the type referred to.

PRIOR ART

Delivery assemblies for machines for the preparation of liquid products via capsules usually comprise a preparation chamber made up of two parts, at least one of which is movable with respect to the other. One part of the chamber is constituted by a capsule-holder, whereas the other part is constituted by an injector.

The injector in general has a tubular injector body, associated to which is a perforation device, which usually comprises a plate from which a plurality of tips project at the front. Slidably coupled to the injector body is a front lid, having a wall provided with a plurality of holes, axially aligned to the tips of the perforation device. The perforation device is hence substantially housed in a chamber defined between the injector body and the corresponding lid, with the chamber that is in fluid communication with the source of water and/or steam under pressure used for preparation of the liquid product. The lid is able to displace, against the action of elastic means, from an advanced position to a retracted position, where the aforesaid tips do not project and do project, respectively, beyond the front lid.

When a capsule is loaded into the delivery assembly, with the injector and the capsule-holder in a spaced apart position, the lid of the injector is in the aforesaid advanced position. During passage of the injector and of the capsule-holder to the respective close position, the lid first sets itself up against an end wall of the capsule. As the injector and the capsule-holder continue to approach one another, when the capsule is by now altogether inserted into the capsule-holder, the lid slides backwards with respect to the injector body, against the action of the aforesaid elastic means so as to reach its retracted position: in this way, the tips of the perforation device can perforate the end wall of the capsule and enable the preparation fluid to penetrate therein. After delivery of the liquid product, when the injector and the capsule-holder are brought back into the spaced apart position, the elastic means of the injector bring the lid back into its advanced position.

The aforesaid elastic means are typically constituted by a metal torsion spring, i.e., a helical spring, which extends axially in the direction of sliding of the lid with respect to the injector body. One end of the spring bears upon the inner surface of the lid, and the other end bears upon a bottom or a transverse wall of the injector body.

Solutions of this type are known, for example, from EP 2170133 A and from WO 2008096385 A, on which the preamble of claim 1 is based.

In these solutions the spring must be housed directly inside the chamber defined between the injector body and the corresponding lid. The spring must moreover have a considerable diameter, to provide the pre-loading necessary to guarantee fluid-tightness of the lid with respect to the body of the capsule, during injection, and for enabling maintenance of the advanced position where the tips are covered. A metal spring of such dimensions is thus potentially subject to the release of contaminating substances in the fluid injected into the capsule, all the more so if it is considered that the spring is, at each delivery cycle, immersed in the fluid at high temperature, which is then introduced into the capsule. The fact that the metal spring has a large diameter has as consequence that also the chamber defined between the injector body and the corresponding lid must have a relatively large volume, which causes significant stagnation of water within the injector following upon a delivery cycle.

The aforesaid drawbacks are overcome in the case of injectors of the type described in EP 1369069 A or EP 1295554 A. Provided in these solutions is a plurality of metal helical springs of small diameter, instead of a single spring of large diameter. Also in this case, the springs extend in the direction of sliding of the lid and interact between the latter and the casing, but are arranged on the outside of the chamber where the perforation device is located. These solutions complicate, however, production of the injector as a whole, in view of the need to provide purposely designed seats for the springs and guide elements for guiding sliding of the lid, and determine an increase of the lateral encumbrance of the injector.

OBJECT AND SUMMARY

In its general terms, the aim of the present invention is to solve the aforesaid drawbacks in a simple and economically advantageous way. This and other aims, which will emerge clearly hereinafter, are achieved according to the present invention thanks to a machine for the preparation of beverages and liquid products in general having the characteristics recalled in claim 1. Advantageous developments of the invention form the subject of the dependent claims. The claims form an integral part of the technical teaching provided herein in relation to the invention.

BRIEF DESCRIPTION OF THE DRAWINGS

The invention will now be described, purely by way of non-limiting example, with reference to the annexed drawings, wherein.

DESCRIPTION OF PREFERRED EMBODIMENTS

Figure 1:
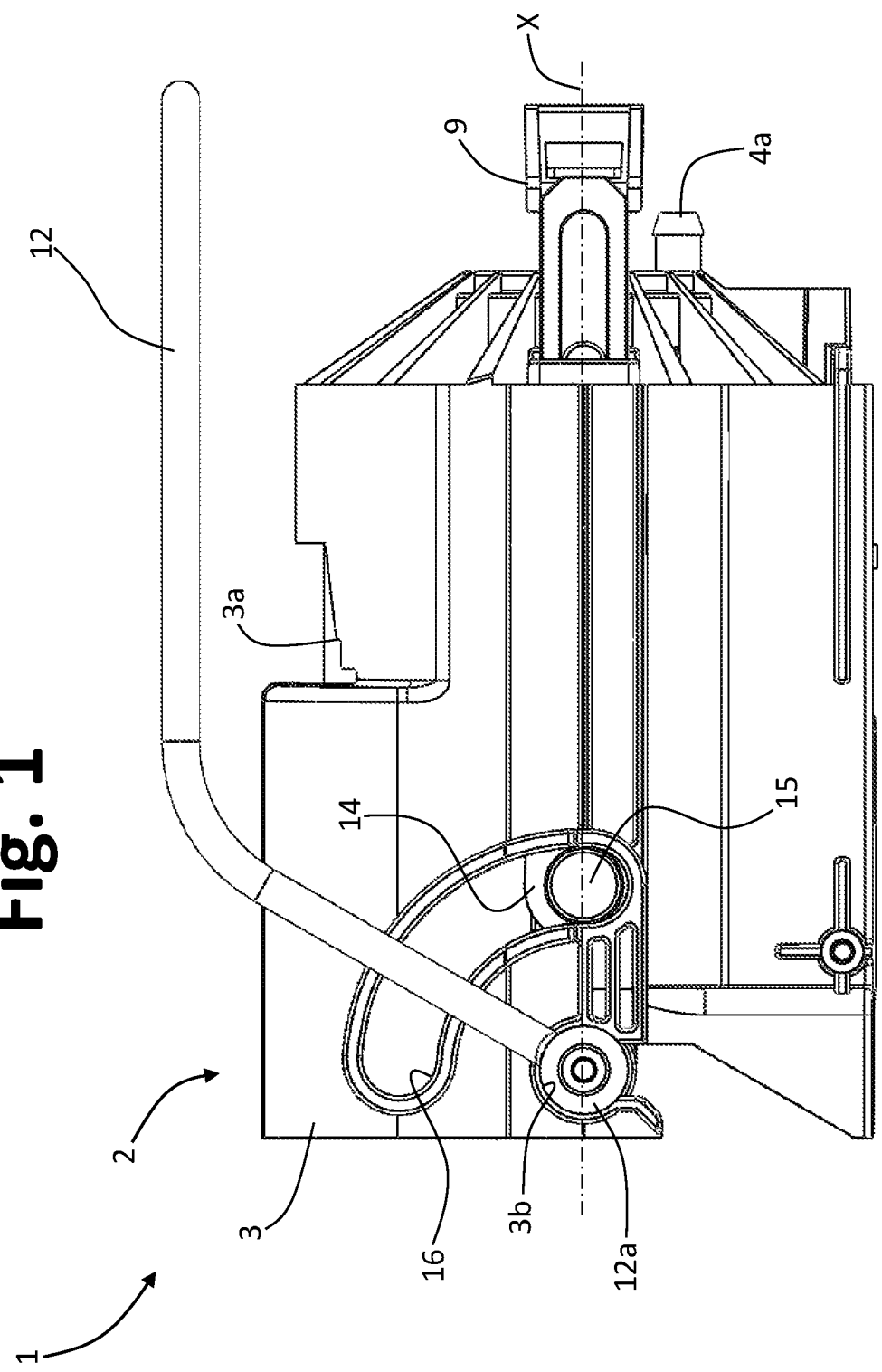
FIG. 1 is a schematic view in side elevation of a machine for the preparation of liquid products according to one embodiment of the invention.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" and the like that may be present in various points of this description do not necessarily refer to one and the same embodiment. Furthermore, particular conformations, structures, or characteristics may be combined in any adequate way in one or more embodiments. The references used herein are merely provided for convenience and hence do not define the sphere of protection or the scope of the embodiments.

It is moreover pointed out that the machine according to possible embodiments of the invention will be illustrated and described limitedly to some parts of a delivery assembly thereof, which constitutes a specific aspect of the invention, taking for granted that associated to this assembly are all the other elements in themselves known for operation of an ordinary machine for the preparation of beverages via capsules, amongst which, for example, a water tank, an electrical pump, an electric heater, a user interface, etc.

Partially and schematically represented in FIGS. 1-4 is a machine 1 for the preparation of liquid products via capsules, in particular for the preparation of coffee. The machine 1 has a delivery assembly 2 having a casing 3, located in which is a preparation chamber comprising two parts, at least one of which is movable with respect to the other. In the example illustrated, the first part includes a capsule-holder 4, defining a housing configured for receiving at least partially a capsule and delivering the liquid product obtained by means thereof, and for this purpose the capsule-holder 4 has an outlet 4a of its own. In the example, the capsule-holder 4 is stationary and at least part of its structure is defined by the casing 3.

The second part of the infusion chamber comprises an injector device 5, referred to hereinafter for simplicity as "injector", configured for introducing into a capsule water and/or steam under pressure, supplied by means of a respective inlet 5a. In the example illustrated, the injector 5 is substantially coaxial with the capsule-holder 4 and is mounted so as to displace linearly inside the casing 3 according to an axis designated by X in FIG. 1, via guides of any known conception. For instance, in one embodiment, defined on each of the two opposite sides of the casing 3 is a linear guide, and engaged in the two guides—which are parallel to one another and with respect to the axis of the assembly 2—are respective lateral guide elements for the injector 5, for example the ends of a pin belonging to an actuation system of the assembly 2. Preferably, associated to the injector 5 is a one-way valve (not represented), designed to open only when the pressure of the incoming preparation fluid (in particular, water and/or steam) has reached a given value; one such valve can be integrated inside the injector 5 or else be set outside it.

The assembly 2 includes an arrangement for loading a capsule, which comprises an inlet passage and means that can assume a condition where they withhold the capsule introduced into the assembly 2 and a condition where they release it. Preferably, the aforesaid means are also configured so as to guide the capsule as far as the aforesaid withholding position, all according to techniques in themselves known. In one embodiment, for example, the withholding and guide means are of the type described in WO 2012/168917 A, the teachings of which are to be considered incorporated herein for reference.

Figure 2:
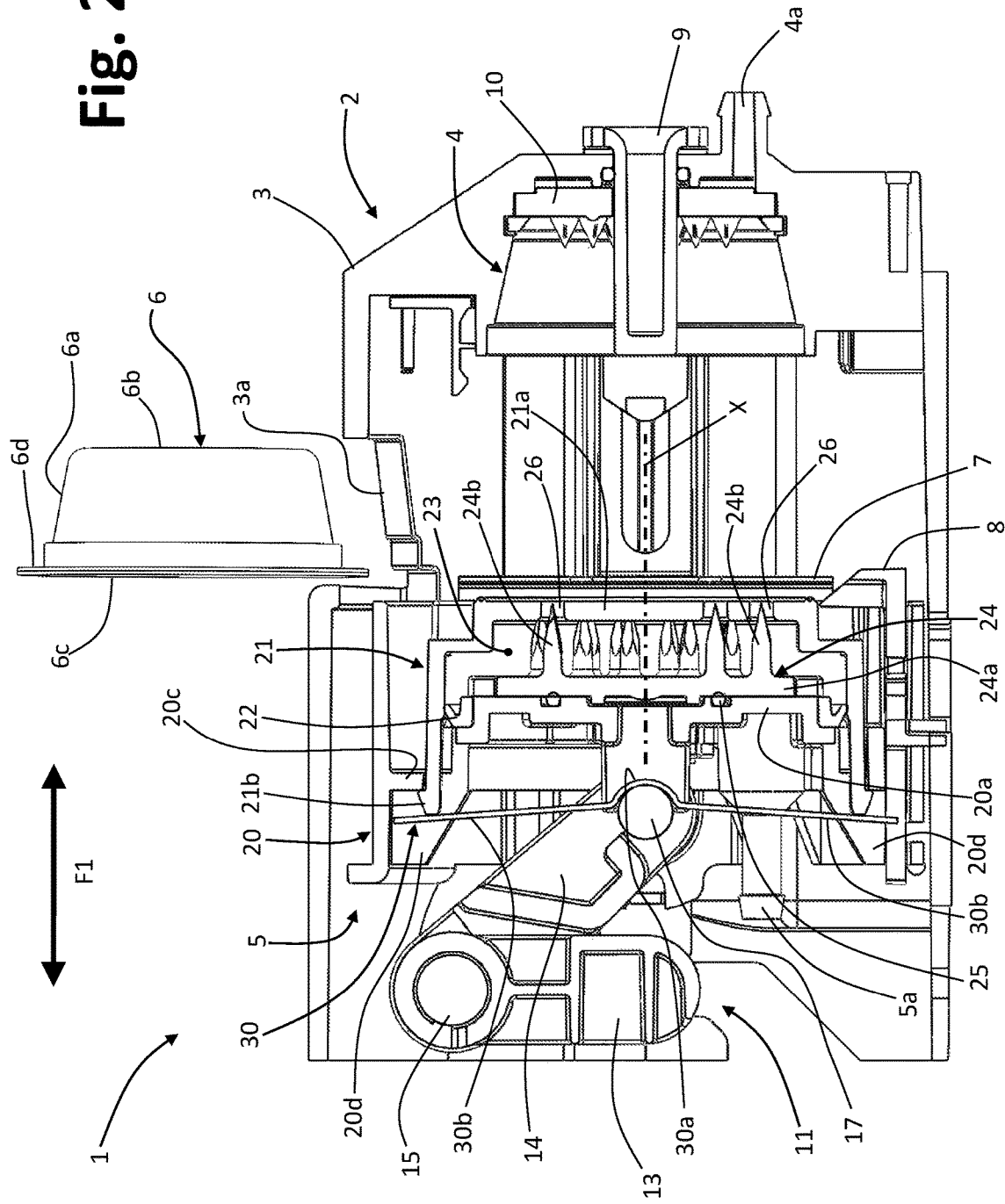
FIG. 2 is a partial and schematic longitudinal section of a machine according to one embodiment of the invention, in a first condition.

A capsule that can be used in the assembly 2 is designated by 6 in FIG. 2. In the example, the capsule 6, of a conception in itself known, has a substantially cup-shaped body, with a peripheral wall 6a and a bottom 6b, and a closing wall 6c opposite to the bottom 6b, preferably formed by a sealing foil. The body 6a defines, at its mouth opposite to the bottom 6b, a flange 6d on which the closing wall 6c is fixed, for example via heat sealing. Housed inside the cup-shaped body is a dose of a precursor that is able to form a liquid product via a preparation fluid, such as water and/or steam under pressure, the precursor comprising, for example, ground coffee.

In one embodiment, such as the one exemplified in the figures, the casing 3 has, in its upper part, an entry opening 3a, forming part of the aforesaid loading arrangement. In the example, the profile of the opening 3a substantially corresponds to the cross section of the capsule 6 so as to enable guided introduction thereof with relative precision into the assembly 2. To the opening 3a there corresponds, in the lower part of the casing 3, an opening for discharging the capsule (not indicated but partially visible for example in FIGS. 3 and 4).

Provided at the two sides of the injector 5, substantially a little beyond its front, are vertical guides 7 for the capsule 6, preferably configured for being engaged by the flange 6d of the capsule itself. The guides 7 may be fixed to the body of the injector 5, or else may be configured as distinct components, but fixed in motion with respect to the injector, at a fixed distance from one another. Provided in the lower part of the injector 5 is a lower support 8 for the capsule 6, which can be switched between an operative position and an inoperative position, for example according to the teachings of the aforementioned WO 2012/168917 A. As already mentioned, in any case, the means for guiding and withholding the capsule 6 inside the assembly 2 may be of any type known in the sector.

Preferably, the assembly 2 also includes means for extraction or expulsion of a spent capsule from the housing defined by the capsule-holder 4. Also these means may be of any type known in the sector. In one embodiment, such as the one exemplified in the figures, these means include an ejector member 9, which is mounted movable in an opening provided in the bottom of the capsule-holder 4. The specific construction and the modalities of actuation of the ejector member 9 do not fall within the purposes of the invention, and consequently will not be described herein. To the bottom wall of the capsule-holder 4 there may be associated a perforation device, comprising one or more tips or reliefs. Once again with reference to the example illustrated, one such perforation device, which is also of any known type, is designated by 10 and has a central passage for the ejector member 9. Irrespective of the specific conformation of such a device 10, the liquid that flows out of the capsule 6, which is torn at the bottom by the aforesaid tips, can reach the passage 4a. The latter can be connected, for example via a suitable duct, to a nozzle for delivery of the liquid product. The invention may in any case be applied also to the case of delivery assemblies for capsules having a pre-perforated bottom wall, in which case it is not necessary to provide a perforation device inside the capsule-holder 4.

Displacement of the injector 5 in the two opposite directions indicated by the arrow F1 of FIG. 2 is obtained by means of an actuation system, designated as a whole by 11. In various embodiments, the actuation system 11 comprises a mechanism substantially of a toggle type or comprising a rocker and at least one connecting-rod member, for example one that may be operated manually by a user via a purposely provided lever, of the type as the one designated by 12 in FIG. 1. In other embodiments, the actuation mechanism may include gears or an electric driving motor. Also the actuation system 11 may in fact be of any type known in the sector.

Figure 5:
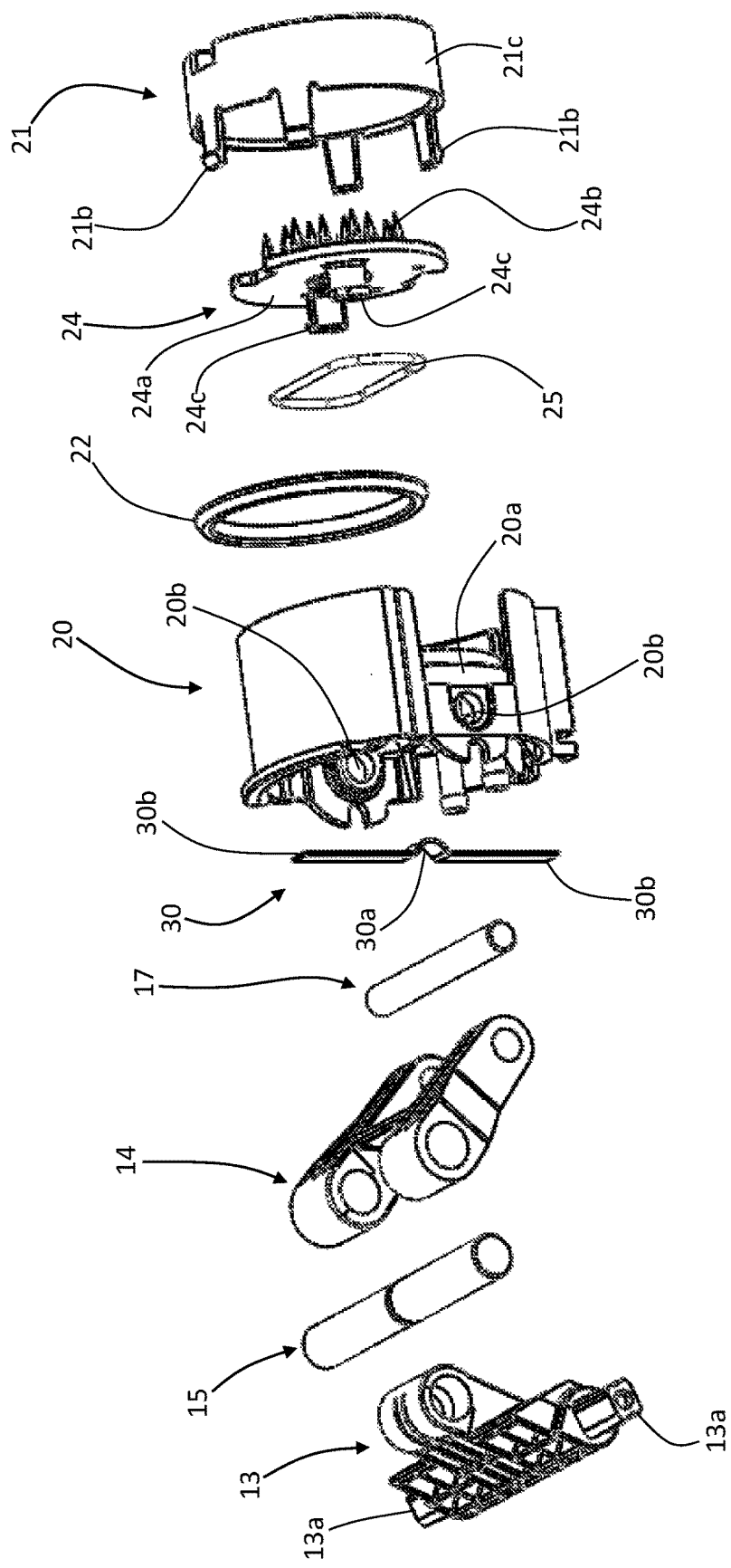
FIG. 5 is a schematic exploded view of some parts of a delivery assembly of a machine according to one embodiment of the invention.

In one embodiment, such as the one exemplified in the figures, the actuation system 11 includes a rocker 13, with two opposite pins 13a (see also FIG. 5) rotatably constrained in respective seats (one of which is designated by 3b in FIG. 1), defined in the two opposite sides of the casing 3, there being associated to these pins of the rocker 13 the ends 12a of the lever 12. The rocker 13 is articulated to a connecting-rod member 14 via a pin 15, movable in arched guide slits defined on the two opposite sides of the casing 3, one of which is designated by 16 in FIG. 1. The connecting-rod member 14 is constrained, via a second pin 17, to the body of the injector 5, as will emerge hereinafter. The axes of rotation of the actuation system 11 identified by the pins 13a of the rocker 13 and by the pins 15 and 17 are hence substantially perpendicular to the direction of linear displacement F1 of the injector 5 with respect to the capsule-holder 4.

With reference, in particular, to FIGS. 2-5, the injector 5 has a generally hollow body that includes at least one first body part 20 and one second body part 21, which is axially slidable with respect to the first body part 20. In the example illustrated in the figures, the axis of sliding between the body parts 20 and 21 substantially corresponds to the axis X of displacement of the injector 5 with respect to the capsule-holder 4. In what follows, for simplicity, the parts 20 and 21 will be defined as "injector body" and "lid", respectively.

In one embodiment, such as the one exemplified, the injector body 20 is approximately cylindrical and has an intermediate transverse wall 20a, provided with the inlet 5a for the preparation fluid. In the example, the injector body 20 is connected to the actuation system 11. For this purpose, in a position set behind the intermediate wall 20a, the injector body 20 has, on two opposite sides, circular through seats 20b (FIG. 5), which can be engaged by the pin 17 connected to the connecting-rod member 14.

Also the lid 21 has a substantially cylindrical hollow shape, with an end wall 21a that basically provides a front wall of the injector 5. In the example, the injector body 20 and the lid 21 have different diameters and are mounted in a substantially telescopic way with respect to one another. Operative between the injector body and the lid is at least one sealing member 22, preferably but not necessarily mounted on the injector body 20.

In one embodiment, such as the one represented, the lid 21 has a plurality of rear projections 21b, configured for engagement with the injector body 20. Preferably, in this case, the intermediate wall 20a of the injector body 20 has a plurality of passages for coupling of the ends of the projections 21b. In an advantageous embodiment, the aforesaid ends of the projections 21b define respective engagement teeth, which can co-operate with respective portions 20c of the injector body 20 in order to prevent sliding out of the lid from the injector body. Coupling between the aforesaid passages and projections moreover makes it possible to guide substantially linear sliding between the parts 20 and 21 of the injector 5.

Defined between the injector body 20 and the lid 21 is a chamber 23, at least partially housed in which is a perforation device, designated as a whole by 24. In the example illustrated, the intermediate wall 20a of the injector body 20 is shaped to define the chamber 23 together with the front wall 21a and with a tubular peripheral portion 21c (FIG. 5) of the lid, the projections 21b departing backwards from the tubular portion 21c. The perforation device 24 is associated to a front of the injector body 20, here represented by at least one portion of the first side of the intermediate wall 20a.

Figure 3:
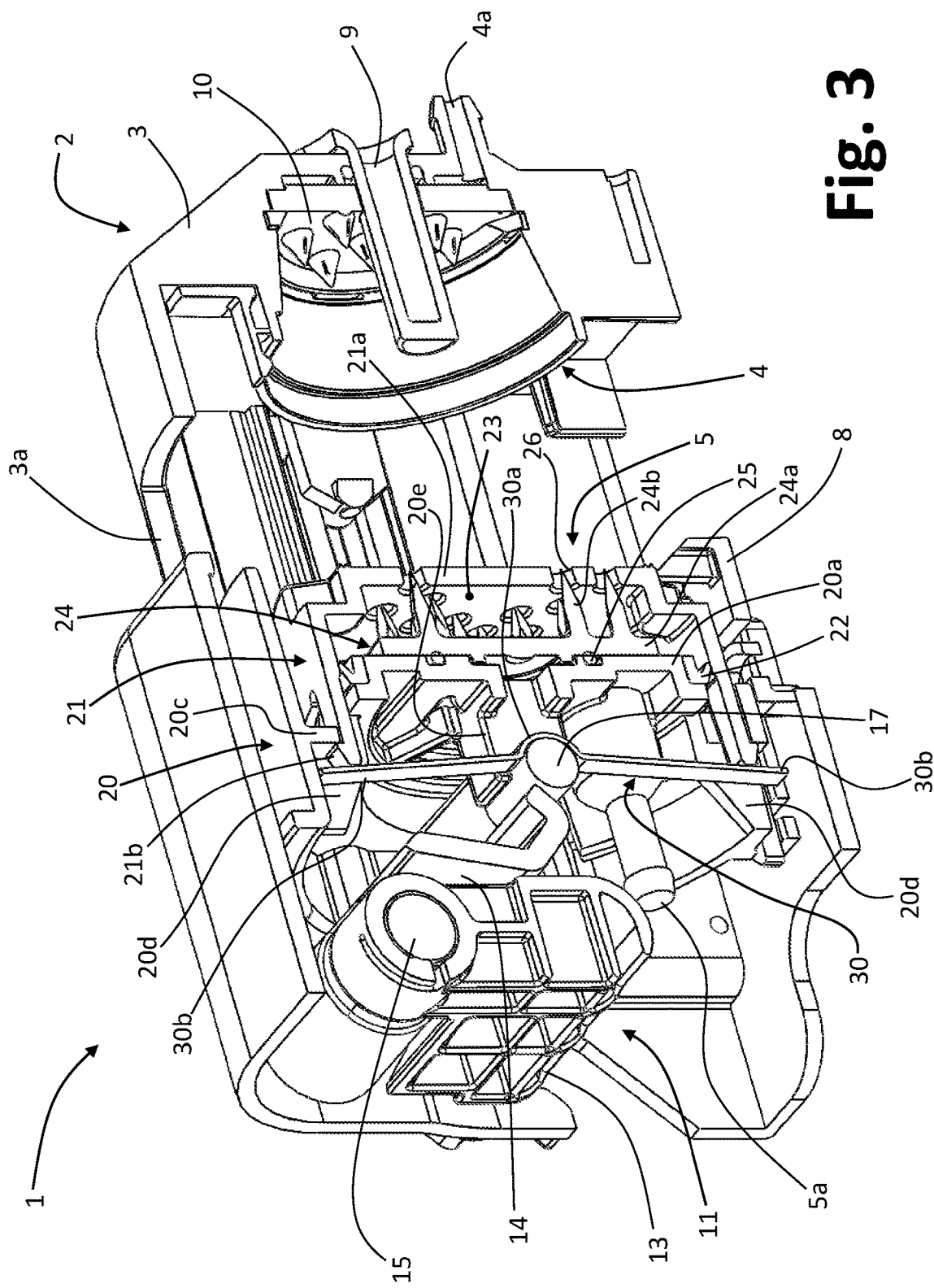
FIGS. 3 and 4 are partially sectioned schematic perspective views of the machine of FIG. 2 in the aforesaid first condition.

The perforation device 24 has at least one front perforation element that is axially aligned to a respective through hole defined in the front wall of the lid 21. In the embodiment exemplified, the device 24 basically consists of a base 24a configured like a plate, from which a plurality of perforation tips 24b project at the front. In FIGS. 2-3 the tips 24b, axially aligned to holes 26 of the wall 21a of the lid, are clearly visible.

Preferably, the base 24a is coupled to the first side of the intermediate wall 20a of the injector body 20, for example via snap-action couplings or bayonet couplings. The parts of these couplings corresponding to the base 24a of the device 24 are designated by 24c in FIG. 5. Once again preferably, moreover set between the intermediate wall 20a of the injector body 20 and the base 24a of the perforation device is a seal gasket 25. In the region circumscribed by this gasket the base 24a preferably has at least one through opening, in fluid communication with the inlet 5a of the injector 5. In this way, the fluid entering the injector 5 can reach the chamber 23.

Figure 6:
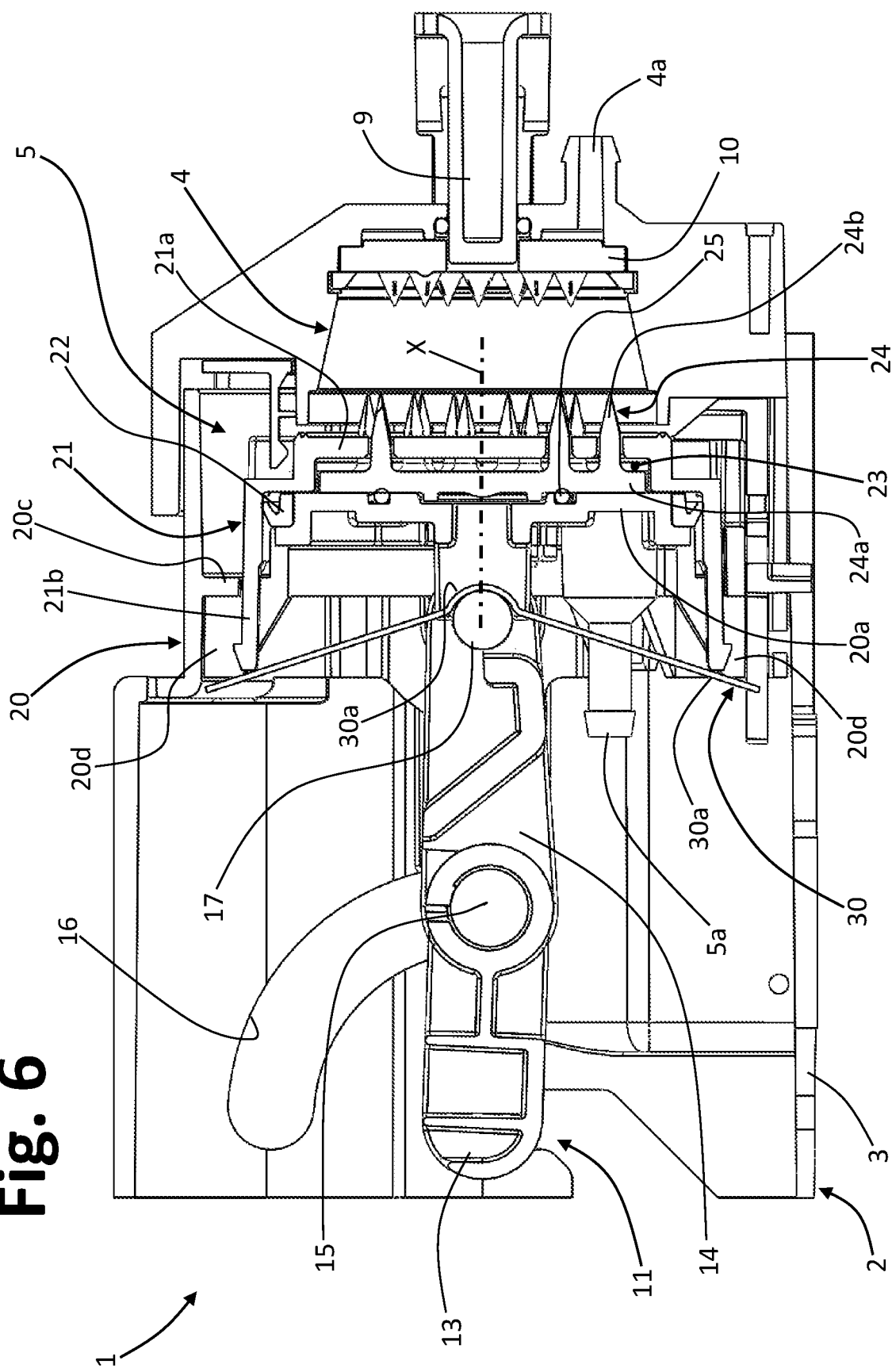
FIGS. 6 and 7 are views like those of FIGS. 2 and 3, with the machine in a second condition.
Figure 7:
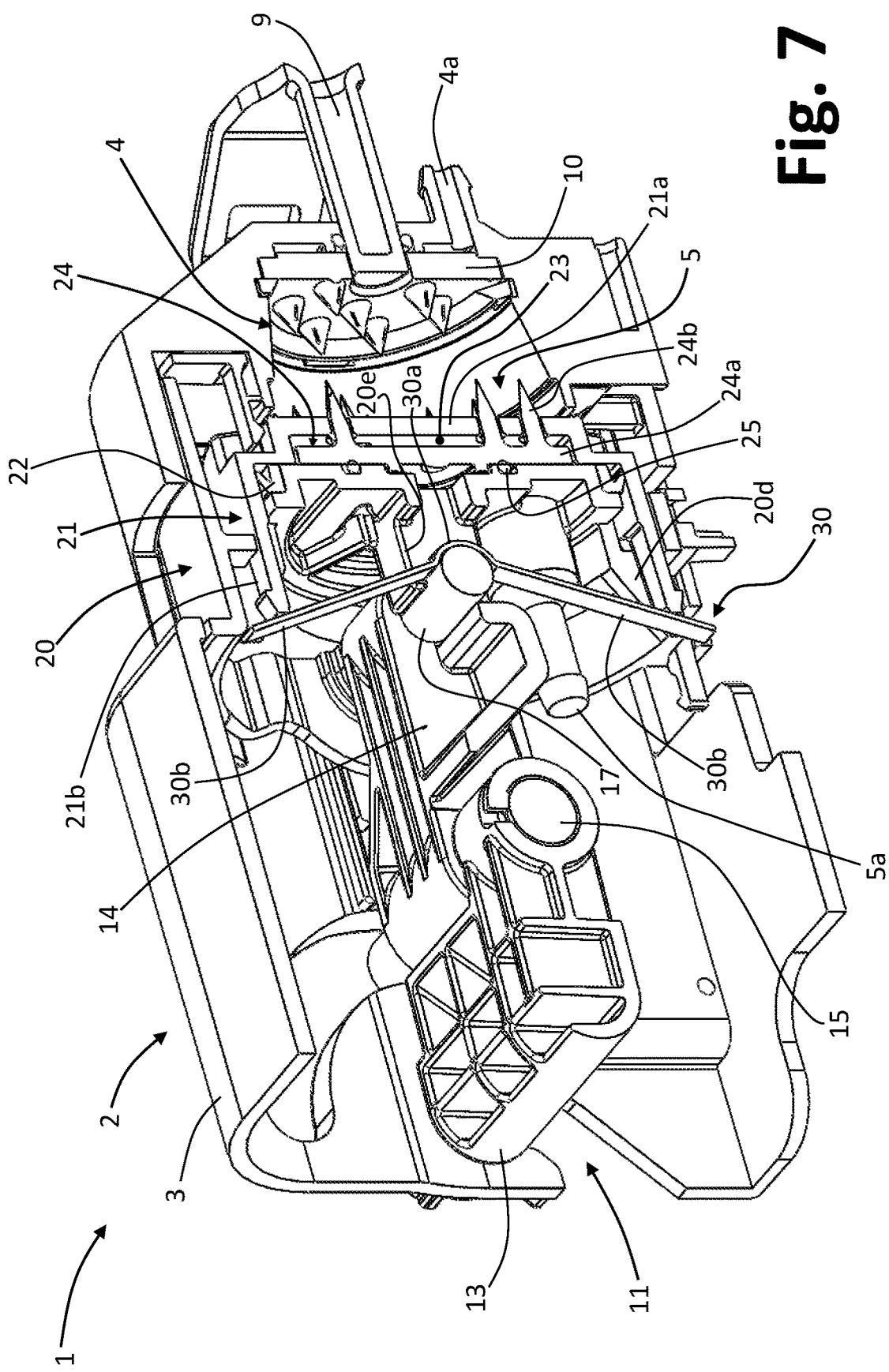

The lid 21 is slidable against the action of elastic means, from an advanced position (visible in FIGS. 2-4) to a retracted position (visible in FIGS. 6-7). As may be appreciated, in the aforesaid advanced position of the lid 21 (see FIG. 2), the tips 24b of the perforation device 24 do not project substantially beyond the front wall 21a of the lid. Instead, in the aforesaid retracted position (see FIG. 6), the tips 24b project considerably beyond the wall 21a in order to be able to perform their perforating function, as described hereinafter.

According to a main aspect of the invention, the elastic means that urge the lid 21 towards the respective advanced position comprise a bending spring, which extends in a direction transverse to the direction of axial sliding of the lid 21 with respect to the injector body 20. As may readily be noted, for example, in FIGS. 2 and 6, the aforesaid bending spring—designated as a whole by 30—extends transversely with respect to the axis X of sliding of the lid 21, i.e., to the axis of relative displacement between the capsule-holder 4 and the injector 5.

In a preferred embodiment, such as the one illustrated, the bending spring is a leaf spring, preferably made of a metal material, for example steel.

In one embodiment, the spring 30 has an intermediate portion 30a that is constrained to the injector body 20 and from which there extend in opposite directions at least two spring arms 30b, designed to co-operate with the lid 21.

With reference to the preferred embodiment exemplified, the intermediate portion 30a of the spring is shaped for coupling with an element that is associated to the injector body 20. In the case illustrated, the aforesaid element is represented by the pin 17, which, as has been seen, provides an element for connection of the injector body 20 to the connecting rod 24 belonging to the actuation system 11, and the intermediate portion 30a has a generally arched conformation. Of course, according to possible variant embodiments (not represented), the intermediate portion of the spring 30 may be shaped for direct coupling with the body of the injector body 20, for example with its intermediate wall 20a, the back of which may for this purpose be provided with seats for positioning and engagement of the spring.

The spring arms 30b have respective end regions that are urged elastically against respective rear portions of the lid 21 of the injector and are able to slide with respect to them during passage between the aforesaid advanced and retracted positions of the lid. In the embodiment exemplified, the aforesaid rear portions of the lid 21, on which the spring arms 30*b* rest, are represented by the ends of the engagement projections 21*b*, as may be clearly seen, for example, in FIGS. 2-3 and 6-7.

In the preferred embodiment, the bending spring 30 extends outside the chamber 23 defined between the injector body 20 and the corresponding lid 21, as emerges clearly in the figures, and hence without coming into contact with the fluid that is to reach the capsule set inside the assembly 2.

Advantageously, the injector body 20 may present positioning seats for the bending spring. In one embodiment, for example, at least two opposite peripheral seats are provided, each for one end region of a respective spring arm 30*b*. In the example illustrated, these seats are defined by pairs of walls parallel to one another and with respect to the axis of the injector body 20, between which an end portion of a corresponding spring arm 30*b* is inserted with the possibility of moving. Only one of the walls of each pair, designated by 20*d*, may be seen in the figures.

Preferably, a seat 20*e* is also provided for positioning the central portion 30*a* of the spring 30, which in the example illustrated is defined in a rear formation of the intermediate wall 20*a* of the injector body 20.

Figure 4:
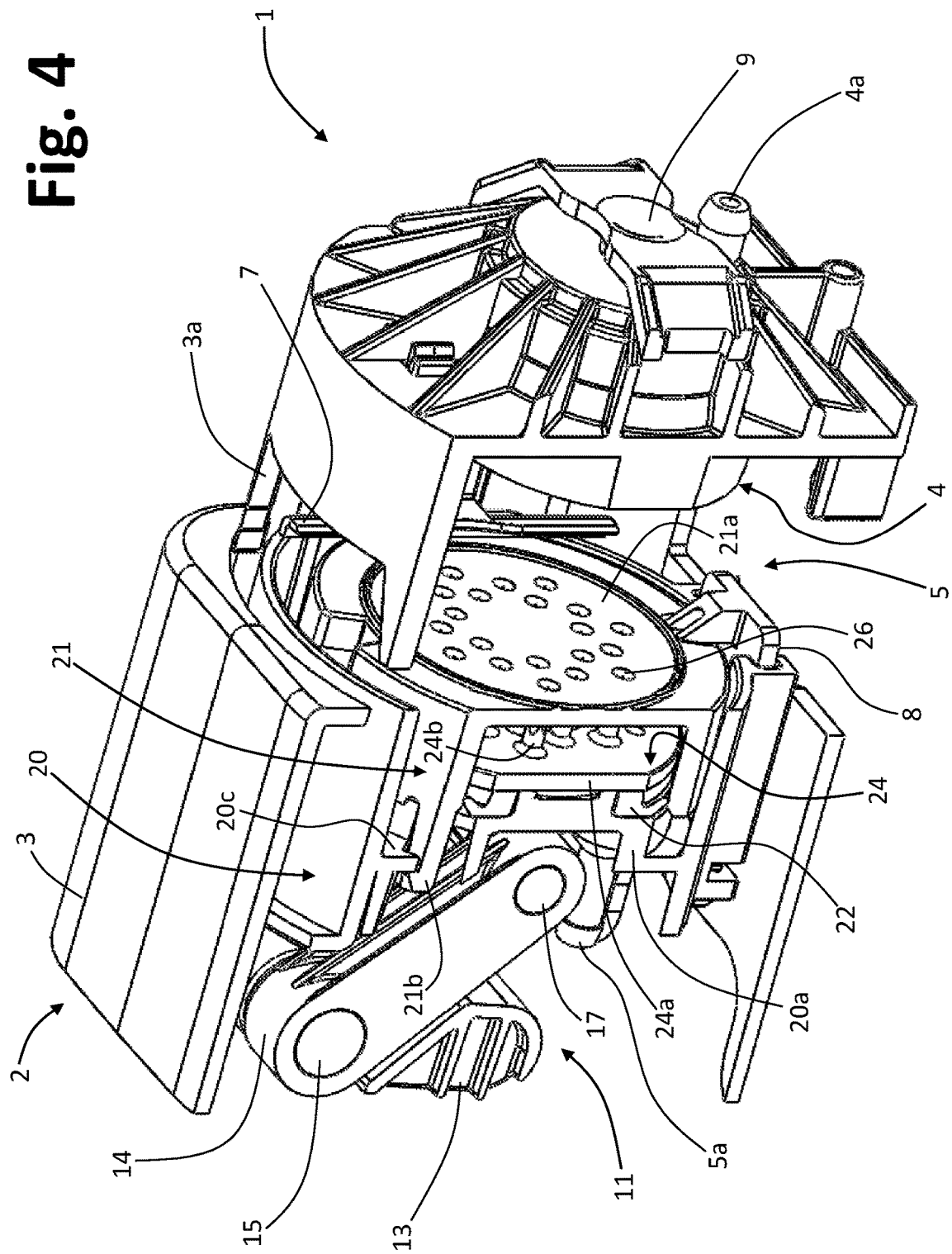

In use, starting from the retracted position of the injector 5 visible in FIGS. 2-4, a capsule 6 is inserted in the passage 3*a* and guided, by means of the side guides 7, as far as the withholding position determined by the lower support 8 carried by the injector body 20. In this position, the capsule 6 is substantially coaxial with the injector 5 and the capsule-holder 4, with its wall 6*d* generally parallel to the front wall 20*a* of the lid 21 of the injector 5, which is kept in its advanced position thanks to pre-loading of the spring 30 (in FIGS. 2-4 and 6-7, the capsule 6 has not been represented for reasons of greater clarity of the drawings).

The actuation system 11 is then actuated to cause a clockwise rotation of the rocker 13 towards the position visible in FIGS. 1, 6, and 7. This rotation of the rocker 13 determines a displacement of the pin 15 along the corresponding guide slits 16 and hence, via the connecting-rod member 14, an advance of the injector 5 and of the guides 7 that are fixed with respect thereto. As has been said, in the example considered, the injector 5 is constrained to the linear movement on opposite sides (for example, the two opposite ends of the pin 17 are constrained directly or indirectly in guides defined on the opposite sides of the casing 3). In this way, it is possible to bring about approach of the injector 5 to the capsule-holder 4 into the position represented in FIGS. 6-7.

In the course of the aforesaid displacement, the capsule 6—still supported laterally by the guides 7 and by the lower support 8—is partially introduced into the capsule-holder 4. When the capsule 6 no longer has any possibility of advancing in the capsule-holder (for example, because it has reached the tips of the perforation device 10, if envisaged), further advance of the injector 5 determines first contact between the front wall 21*a* of the lid and the wall 6*c* of the capsule 6.

As the movement of the injector 5 proceeds, the lid 21 passes from its advanced position to its retracted position, countering the action of the spring 30, the arms 30*b* of which bend backwards with respect to the intermediate portion 30*a*, thereby loading further, as may be clearly seen, for example, from the comparison between FIGS. 2 and 6. Hence, in this step, a relative sliding is obtained between the end portions of the spring arms 30*b* and the ends of the engagement projections 21*b*, on which the end portions rest elastically.

The tips 24*b* of the perforation device, now in the extracted condition, thus perforate the wall 6*c* of the capsule 6, and then supply of the preparation fluid can be started. The fluid under pressure penetrates into the chamber 23 of the injector 5 from the inlet 5*a*, traversing the intermediate wall 20*a* of the injector body 20 and the base of the device 24, and then flows on the outside through the gaps present between the tips 24*b* and the corresponding holes 26 of the wall 21*a*. In this step, between the front wall 21*a* of the lid and the wall 6*c* of the capsule a peripheral seal is provided, in particular thanks to an annular gasket present in a position corresponding to the wall 21*a* (this gasket, for example, is clearly visible in FIG. 4, but does not bear any reference number). The fluid under pressure can then reach the inside of the capsule 6, traversing the gaps between the tips 24*b* and the edges of the openings that the tips have made in the wall 6*c* of the capsule. Inside the capsule 6 the fluid comes into necessary contact with the precursor, and the liquid product thus formed exits from the bottom 6*b* of the capsule, for example perforated via the perforation device 10 associated to the capsule-holder 4, and then flows out through the outlet 4*a*.

Next, by causing a rotation of the rocker 13 in a counterclockwise direction, it is possible to obtain an opposite displacement, i.e., a recession of the injector 5, away from the capsule-holder 4. As has been said, the specific modalities of withholding, guiding, and ejection of the capsule with respect to the assembly do not fall within the purposes of the invention since they may be obtained in any known way, for example as described in WO 2012/168917 A. In the course of the movement of return of the injector 5, also the spring 30 once again assumes the condition illustrated in FIG. 2, with new sliding of the end portions of the arms 30*b* on the projections 21*b*.

From the foregoing description, the characteristics of the present invention emerge clearly, as likewise its advantages. Thanks to the use of a bending spring set transversely with respect to the axis of sliding of the parts of the injector device, the structure of the latter is simple, compact, and reliable in operation. The leaf configuration of the spring is particularly advantageous for the purposes of containment of the overall dimensions. The bending spring is housed on the outside of the chamber defined between the injector body and the corresponding lid, thereby preventing any contact between the spring itself and the liquid for preparation of the liquid product, at the same time enabling a considerable reduction of the volume of the aforesaid chamber, thereby reducing to a minimum any possible stagnation of fluid inside the injector.

Without prejudice to the principle of the invention, the details of construction and the embodiments may vary, even significantly, from what has been illustrated herein purely by way of non-limiting example, without thereby departing from the scope of the invention as defined in the annexed claims.

In alternative embodiments (not represented), the injector device of the assembly may be stationary (obviously except for its perforated lid), and the capsule-holder be movable, or else both the capsule-holder and the injector may be movable with respect to one another in order to obtain approach and recession between the injector and the capsule-holder.

The actuation system of the assembly, of any known type suitable for this purpose, may be operated manually or via an actuator, such as an electric motor.

The invention is such as to be usable also in the case of delivery assemblies with roto-translational motion of the corresponding capsule-holder, for example of the type described in WO 2011/015978 A1.

The invention claimed is:

1. A machine for the preparation of a liquid product via a capsule, comprising a delivery assembly, the assembly having:
   a preparation chamber, which comprises a first part and a second part, the first part of chamber having a housing configured for receiving at least partially said capsule and enabling delivery of said liquid product from the preparation chamber, the second part of chamber having an injector device configured for introducing a preparation fluid into said capsule; and
   an actuation system controllable for causing relative movements between the first part of chamber and the second part of chamber, between a spaced apart position and a close position,
   wherein the injector device has a hollow body that includes a first body part and a second body part, which is axially slidable with respect to the first body part, there being defined between the two body parts a chamber, housed in which is a perforation device associated to a front of the first body part;
   wherein the perforation device has at least one front perforation element that is axially aligned to a respective through hole, defined in a front wall of the second body part;
   wherein the second body part is slidable, against the action of elastic means, from an advanced position, in which the at least one perforation element does not project substantially beyond said front wall, to a retracted position, in which the at least one perforation element projects substantially beyond said front wall,
   wherein the elastic means comprises a bending spring that extends in a direction transverse to the direction of axial sliding of the second body part with respect to the first body part.

2. The machine according to claim 1, wherein the bending spring extends outside the chamber, defined between the first body part and the second body part.

3. The machine according to claim 1, wherein the bending spring is a flat or leaf spring.

4. The machine according to claim 1, wherein the bending spring has an intermediate portion constrained with respect to the first body part, from which at least two spring arms extend in opposite directions for co-operating with the second body part.

5. The machine according to claim 4, wherein the intermediate portion of the bending spring is shaped for coupling with one of the first body part and an element associated to the first body part.

6. The machine according to claim 5, wherein said element associated to the first body part is an element for connection of the first body part to a transmission member belonging to the actuation system.

7. The machine according to claim 4, wherein the spring arms have respective end regions, which are elastically urged against respective rear portions of the second body part that are able to slide with respect to said rear portions during passage between said advanced and retracted positions of the second body part.

8. The machine according to claim 7, wherein the second body part has a plurality of rear projections, configured for engagement with the first body part, the rear ends of two said rear projections forming said rear portions of the second body part.

9. The machine according to claim 1, wherein the first body part has positioning seats for the bending spring.

10. The machine according to claim 9, wherein the positioning seats comprise at least one of:
    a central seat for the intermediate portion of the bending spring; and
    two peripheral seats, each for an end region of a respective spring arm which extends from an intermediate portion of the bending spring.

11. The machine according to claim 1, wherein the first body part and the second body part of the injector device are mounted in a substantially telescopic way, and operative between them is at least one annular sealing member.

12. The machine according to claim 1, wherein the preparation fluid is water.

13. The machine according to claim 1, wherein the preparation fluid is steam.

14. The machine according to claim 1, wherein the preparation fluid is water and steam.

* * * * *